United States Patent [19]

Brown, Jr.

[11] Patent Number: 4,953,606

[45] Date of Patent: Sep. 4, 1990

[54] TIRE BEAD-BREAKER

[76] Inventor: Daniel E. Brown, Jr., Rt. 2, Afton, Tenn. 37616

[21] Appl. No.: 406,565

[22] Filed: Sep. 13, 1989

Related U.S. Application Data

[63] Continuation-in-part of Ser. No. 214,114, Jun. 30, 1988, abandoned.

[51] Int. Cl.$^5$ .............................................. B60C 25/06
[52] U.S. Cl. ................................................... 157/1.17
[58] Field of Search .................... 157/1, 1.1, 1.17, 1.2, 157/1.26, 1.28

[56] References Cited

U.S. PATENT DOCUMENTS

| | | | |
|---|---|---|---|
| 2,786,517 | 3/1957 | Hammer | 157/1.17 |
| 3,332,467 | 7/1967 | Clark | 157/1.17 |
| 3,706,335 | 12/1972 | Long | 157/1.17 |
| 4,121,644 | 10/1978 | Boyle et al. | 157/1.17 |
| 4,524,813 | 6/1985 | Gering | 157/1.17 |
| 4,646,806 | 3/1987 | Richardson | 157/1.17 |

Primary Examiner—D. S. Meislin

[57] ABSTRACT

A tire bead-breaker having a jack stanchion adapted for substantially vertical use, a jack body mounted on the stanchion for substantially vertical movement therealong, a wheel support associated with and movable with the body and extending outwardly substantially horizontally therefrom, the support having a substantially planar bed for supporting a wheel in substantially horizontal posture with a portion of the tire tread juxtaposed the stanchion such that the side wall thereof faces substantially upwardly, a butting device affixed to the stanchion above the support and being adapted to engage a tire side wall adjacent the tire rim to break the tire bead from the rim in response to upward movement of the body and support and a wheel supported thereon.

12 Claims, 2 Drawing Sheets

TIRE BEAD-BREAKER

The present application is a continuation-in-part of 07/214,114 filed Jun. 30, 1988, abandoned in favor of the present application.

This invention concerns apparatus for breaking pneumatic tires away from their rims, especially large tires such as used on trucks or off-the-road vehicles, and particularly concerns such apparatus which is self-contained and which can be readily adapted from conventional power jack equipment with minimal modification thereof.

Heretofore, apparatus or bead breakers used for such purposes have either not been self-contained or have been highly complex of specialized construction and limited in their capacity to handle a wide variety of wheels and wheel sizes ranging, e.g., from that employed on small vehicles to very large trucks. Such apparatus is shown, for example, in U.S. Pat. Nos.: 4,121,644; 4,676,291; 3,706,335; 4,646,806; 4,524,813; 3,332,467; and 2,786,517, the disclosures of which are incorporated herein by reference for the various and pressure heads or bead contacting elements jacking means disclosed therein.

The present invention has as principal objects therefore, to provide a bead-breaker of self-contained, highly simplified structure and operation, which nevertheless can accommodate an enormous range of wheel sizes and the necessary bead-breaking pressures therefore, and which can utilize in its construction, available power equipment with minimal modification thereof.

These and other objects hereinafter becoming evident have been attained in accordance with the present invention which is defined in its broad sense as a tire bead-breaker comprising jack stanchion means adapted for substantially vertical use, jack body means mounted on said stanchion means for substantially vertical movement therealong, wheel support means associated with and movable with said body means and extending outwardly substantially horizontally therefrom, said support means having substantially planar bed means for supporting a wheel in substantially horizontal posture with a portion of the tire tread juxtaposed said stanchion means such that the side wall thereof faces substantially upwardly, butting means affixed to said stanchion means above said support means and being adapted to engage a tire side wall adjacent the tire rim to break the tire bead from said rim in response to upward movement of said body means and support means and a wheel supported thereon.

The invention will be further understood from the following description and drawings wherein.

Figure 2:
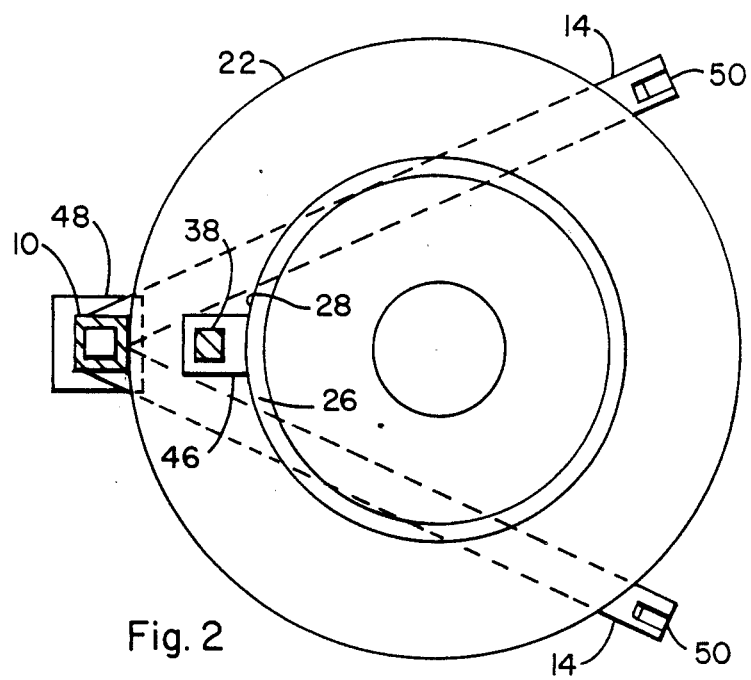
FIG. 2 is a partially sectional view taken along line 2—2 of FIG. 1 in the direction of the arrows.

Referring to the drawings and with reference to claim 1 hereof the tire bead-breaker comprises jack stanchion means 10 adapted for substantially vertical use, jack body means 12 mounted on said stanchion means for substantially vertical movement therealong, wheel support means 14 associated with and movable with said body means and extending outwardly substantially horizontally therefrom, said support means having substantially planar bed means 16 for supporting a wheel 18 in substantially horizontal posture with a portion of the tire tread 20 juxtaposed said stanchion means such that the side 22 wall thereof faces substantially upwardly, butting means generally designated 24 affixed to said stanchion means above said support means and being adapted to engage a tire side wall adjacent the tire rim 26 to break the tire bead 28 from said rim in response to upward movement of said body means and support means and a wheel supported thereon.

Figure 1:
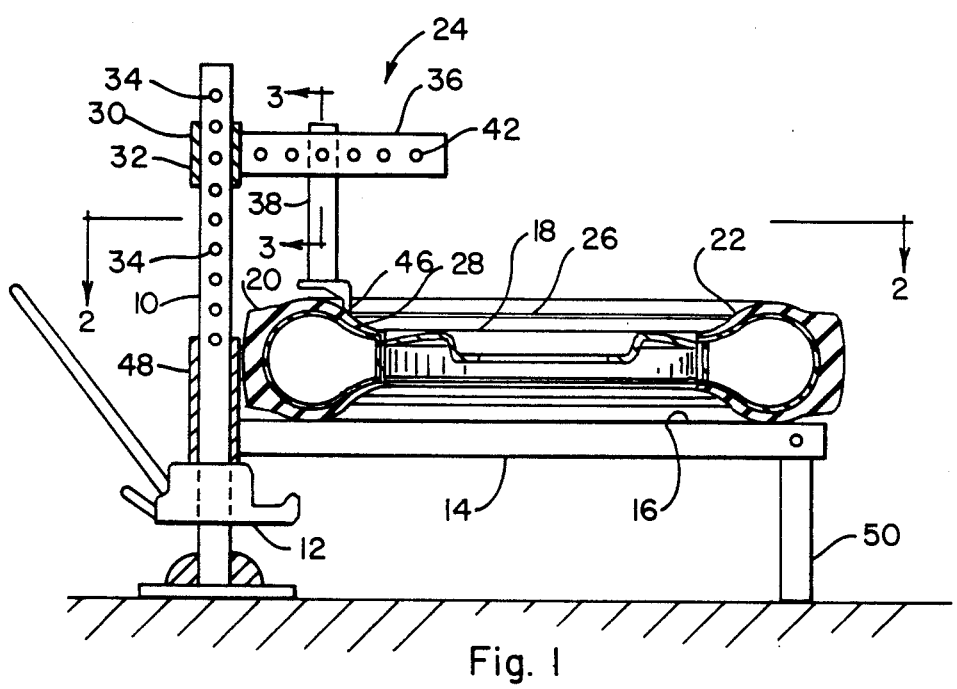
FIG. 1 is a side view, partially in section, of the present bead-breaker.
Figure 3:
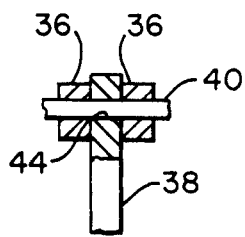
FIG. 3 is a partially sectional view taken along line 3—3 of FIG. 1 in the direction of the arrows.

In further detail and in regard to preferred structure, the jack is a standard ratchet type bumper jack wherein the toothed stanchion or post 10 is provided with a series of apertures for vertical adjustment of the butting means 24. This butting means as shown in FIGS. 1-3 comprises a sleeve 30 slidably mounted on the stanchion and is provided with an aperture 32 through its side walls for receiving a pin or bolt or the like which also passes through one of the mating apertures 34 in the stanchion to provide vertical adjustment of the butting means relative to the wheel support means 14 for properly accommodating various size wheels. Affixed to sleeve 30 are a pair of substantially horizontally disposed arms 36 between which an arm 38 is mounted such as by a pin or bolt 40 passing through one of the aligned aperture pairs 42 in arms 36 and a mating aperture 44 in arm 38. The multiple aperture pairs 42 allow for horizontal adjustment of arm 38 to properly locate the pressure head 46 with respect to the tire bead 28. The actual configuration of head 46 may be greatly varied and may also be removable from arm 38 such that different shaped heads may be used for different size and shaped tires and rims.

The support means 14 is shown as comprising a pair of legs secured to a sleeve 48 slidably mounted on stanchion 10 and abutting the upper edge of the jack body 12. The upper surfaces of these legs provide a planar, substantially horizontal surface 16 for support of the wheel. If desired, a single leg could be used so long as it had adequate supporting surface 16 to provide stability to the wheel workpiece. The legs may, of course, be made as long as necessary for the maximum diameter wheel. The ends of the legs are preferably provided with support pieces 50 bolted or the like thereto to maintain an approximate horizontal posture to the wheel during the bead-breaking operation. In this regard, the actual length of vertical travel of sleeve 48 in the operation will be small, e.g., typically no more than about one inch and, therefore, there need be no concern that excessive tipping of the support out of its substantially horizontal plane will occur such as might adversely affect either the operation or the equipment.

Figure 4:
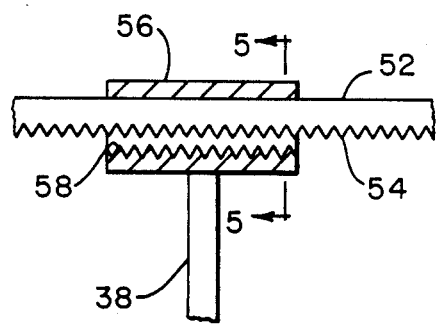
FIG. 4 is a partial longitudinal sectional view of a variation of the butting means adjusting mechanism of FIGS. 1-3.
Figure 5:
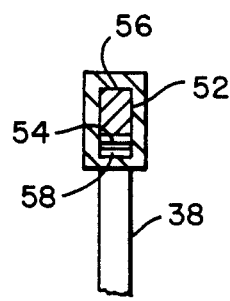
FIG. 5 is a cross-sectional view taken along line 5—5 of FIG. 4 in the direction of the arrows.

In FIGS. 4 and 5 a variation of the butting means horizontal arm and the lateral adjustment mechanism for the vertical arm is shown. The horizontal arm in this embodiment, equivalent to the arm pair 36, comprises a single substantially horizontal arm 52 affixed to sleeve 30 and provided on its bottom edge with teeth or serrations 54. The substantially vertical arm 38 is provided at its upper end with a sleeve 56, normally slidable mounted on arm 52 for lateral adjustment and proper positioning of head 46 with respect to the tire bead. The inner bottom surface of sleeve 56 is also provided with teeth or serrations 58 which are adapted to engage with teeth 54 after the proper lateral adjustment of arm 38 is made, said engagement occurring automatically upon the initial, slight contact of the tire with the pressure head as the jack's upward motion is initiated. Engagement of these teeth locks arm 38 in its adjusted lateral position thereafter throughout the bead-breaking operation. This adjustment mechanism provides extremely easy and convenient positioning of the pressure head, as well as positive positional locking thereof.

It is noted that any of various known means can be used with the present device to hold down the wheel during the bead-breaking operation, including those means shown, for example, in the aforementioned Pat. Nos. 4,524,813 and 4,646,806.

Figure 6:
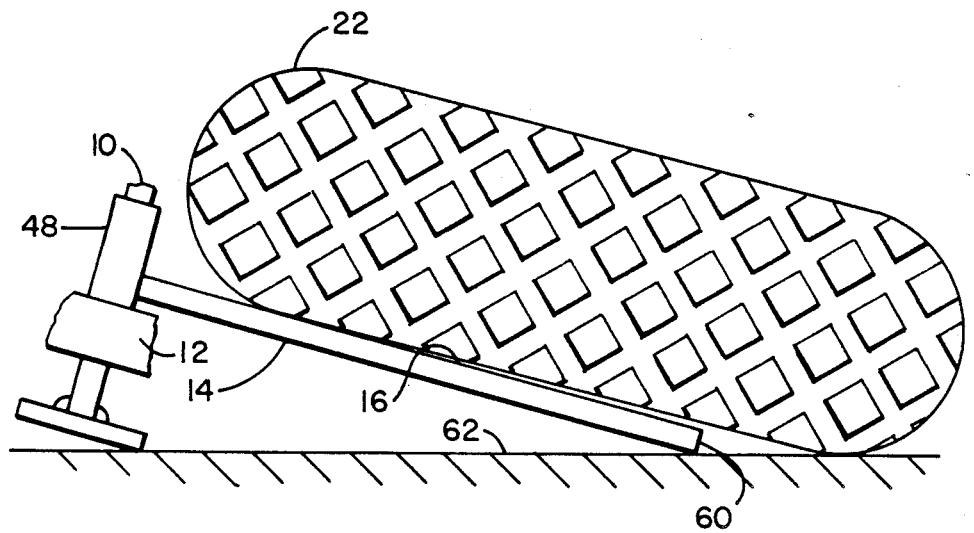
FIG. 6 is a side view showing a tractor type wheel in place on the breaker.

Referring to FIG. 6, the bead-breaker comprises a single elongated member or wheel support means 14, the outer end 60 of which is allowed to rest on the floor 62 with the supporting surface 16 still in a substantially horizontal posture, such that a very large wheel, such as a farm tractor or road equipment would employ, can easily be positioned thereon. In this regard, a single worker can easily pry one side of the wheel, which could weigh several hundred pounds, slightly off the floor to allow end 60 to be inserted thereunder and forced inwardly of the wheel to the position shown wherein the jack can be operated to break the bead.

The invention has been described in detail with particular reference to preferred embodiments thereof, but it will be understood that variations and modifications will be effected within the spirit and scope of the invention.

I claim:

1. A tire bead breaker comprising jack stanchion means adapted for substantially vertical use, jack body means mounted on said stanchion means for axial movement therealong, wheel support means functionally associated with and movable with said body means, said support means having a sleeve segment axially slidably mounted on said stanchion means above said body means and forcibly engageable by said body means in response to actuation of said jack body means, said support means further having at least one elongated member affixed at one of its ends to said sleeve segment, said member extending outwardly from said sleeve segment substantially normally to the longitudinal axis of said stanchion means to provide an unattached end and an essentially unobstructed planar bed means for supporting a wheel in substantially horizontal posture with a portion of the tire tread juxtaposed said stanchion means such that the side wall thereof faces substantially upwardly, butting means affixed to said stanchion means above said support means and substantially adjacent said stanchion means for engaging a tire side wall adjacent the tire rim to break the tire bead from said rim in response to upward movement of said body means and support means and a wheel supported thereon.

2. The breaker of claim 1 wherein said butting means is provided with horizontal adjustment means for accommodating various depth tires.

3. The breaker of claim 2 wherein said butting means is vertically adjustable on said stanchion means for accommodating various width tires.

4. The breaker of claim 1 wherein said stanchion means and body means comprise a jack selected from ratchet, screw or hydraulic operated.

5. The breaker of claim 4 wherein said unattached end of said support means is provided with foot means for engaging a workshop floor and maintaining said support means in a substantially horizontal position within limited travel of said body means on said stanchion means.

6. The breaker of claim 2 wherein said butting means comprises first sleeve means slidably mounted on said stanchion means, first arm means affixed to said first sleeve means and extending generally laterally from said stanchion means, and second arm means being an upper end mounted on said first arm means by said horizontal adjustment means and having a lower end extending downwardly from said first arm means, and pressure head means on said lower end of said second arm means for engaging a tire side wall.

7. The breaker of claim 6 wherein said horizontal adjustment means comprises second sleeve means slidably mounted on said first arm means.

8. The breaker of claim 7 wherein said first arm means and said second sleeve means are provided with cooperating teeth means which are normally disengaged but which become engaged by small upward force applied to said pressure head means, to thereby prevent significant relative motion between said first and second arm means during the bead-breaking operation.

9. The breaker of claim 6, wherein said horizontal adjustment means comprises a series of apertures in said first arm means, cooperating aperture means in the upper end of said second arm means, and pin means for insertion through mating apertures to secure said second arm means in horizontally adjusted position to said first arm means.

10. The breaker of claim 9 wherein said second arm means is pivotally mounted on said first arm means to allow pendulum-like adjustment of said pressure head means substantially radially of a wheel positioned on said support means.

11. The breaker of claim 1 wherein said stanchion means is provided with a base of substantial dimensions to provide said breaker with free-standing, self-support.

12. The breaker of claim 11 wherein said stanchion means and body means comprise a conventional ratchet operated bumper jack.

* * * * *